United States Patent
Poola et al.

(10) Patent No.: US 8,842,651 B2
(45) Date of Patent: Sep. 23, 2014

(54) ACCESS POINT GROUPINGS BRIDGING TUNNELED TRAFFIC FOR A COMMUNICATION NETWORK

(71) Applicant: Motorola Solutions, Inc., Schaumburg, IL (US)

(72) Inventors: Jeelan Poola, Bangalore (IN); Azif Ak, Bangalore (IN); Somesh Agrawal, Bangalore (IN); Channareddy Ireddy, Bangalore (IN); Sukhdeep Singh Johar, Bangalore (IN); Vijay Yadav, Bangalore (IN); Senthilraj Shanmugavadivel, Colmbatore (IN); Sundaresan Sundaram, Karnataka (IN)

(73) Assignee: Motorola Solutions, Inc., Schaumburg, IL (US)

( * ) Notice: Subject to any disclaimer, the term of this patent is extended or adjusted under 35 U.S.C. 154(b) by 99 days.

(21) Appl. No.: 13/687,116

(22) Filed: Nov. 28, 2012

(65) Prior Publication Data

US 2014/0146735 A1    May 29, 2014

(51) Int. Cl.
| | | |
|---|---|---|
| *H04W 4/00* | (2009.01) | |
| *H04W 84/12* | (2009.01) | |
| *H04W 76/04* | (2009.01) | |
| *H04L 12/28* | (2006.01) | |
| *H04W 88/12* | (2009.01) | |
| *H04L 12/46* | (2006.01) | |

(52) U.S. Cl.
CPC ............ *H04W 76/041* (2013.01); *H04W 88/12* (2013.01); *H04L 12/4641* (2013.01); *H04W 84/12* (2013.01); *H04L 12/4633* (2013.01); *H04L 12/2863* (2013.01)
USPC ............................ 370/338; 370/328; 370/390

(58) Field of Classification Search
USPC .......................................... 370/328, 338, 390
See application file for complete search history.

(56) References Cited

U.S. PATENT DOCUMENTS

| | | | |
|---|---|---|---|
| 7,680,109 B2 | 3/2010 | Lundin et al. | |
| 8,098,618 B2 | 1/2012 | Hundscheidt et al. | |
| 8,169,984 B2 | 5/2012 | Iino et al. | |
| 8,391,240 B2* | 3/2013 | Solanki et al. | 370/331 |
| 2002/0089958 A1 | 7/2002 | Feder et al. | |
| 2008/0186962 A1* | 8/2008 | Sinha | 370/389 |
| 2009/0264106 A1* | 10/2009 | Mo et al. | 455/412.2 |
| 2010/0105382 A1* | 4/2010 | Gallagher | 455/434 |
| 2011/0164527 A1* | 7/2011 | Mishra et al. | 370/252 |
| 2012/0149367 A1* | 6/2012 | Miranda et al. | 455/432.1 |
| 2014/0079059 A1* | 3/2014 | Amir et al. | 370/390 |

FOREIGN PATENT DOCUMENTS

| | | |
|---|---|---|
| EP | 1802039 A1 | 6/2007 |
| WO | 2008076859 | 6/2008 |

OTHER PUBLICATIONS

International Search Report and Written Opinion dated Mar. 20, 2014 in counterpart application PCT/US2013/070589.

\* cited by examiner

*Primary Examiner* — Jason Mattis
(74) *Attorney, Agent, or Firm* — Brian M. Mancini

(57) ABSTRACT

An apparatus and method for access point groupings bridging tunneled traffic for a communication network, includes a first step of associating each access point with a location parameter. A next step includes grouping access points in accordance with the location parameter. A next step includes receiving a packet. A next step includes bridging the packet between Layer-2 tunnels of all access points that are part of a grouping.

10 Claims, 4 Drawing Sheets ations center (NoC).
ACCESS POINT GROUPINGS BRIDGING TUNNELED TRAFFIC FOR A COMMUNICATION NETWORK

FIELD OF THE DISCLOSURE

The present invention relates generally to communication networks, and more particularly to access point groupings bridging tunneled traffic for a communication network.

BACKGROUND

As per the recently defined IEEE 802.11u standard, an access point vendor is required to establish a tunnel supporting Layer 2 (L2) tunneling protocols with a service provider to provide communication services for mobile phone users. In particular, a Layer-2 Tunneling Protocol of Version 1, 2, or 3 (L2tpv1/2/3) can be used to establish these L2 tunnels. The tunnels can be used to establish a virtual local area network (VLAN) or wide area network (WAN), herein referred to as "network", that can extend to cover many remote locations.

The VLAN or WAN is useful to coordinate many remote users under a single entity, such as a corporate client network or subnet. However, a network extending across a large number (thousands) of remote locations using L2tpv1/2/3 tunnels naturally poses a central scalability problem, which is processor intensive for one tunnel concentrator of a network operations center (NoC).

For example, there is a problem when it is desired to broadcast or multicast packets to all remote users of the network. Such packets must be replicated to provide one copy for each tunnel in the network. When the L2-tunnel concentrator at the NoC does this duplication, it loops over the list of tunnels and creates one copy of the packet for each tunnel. Obviously, where there are thousands of tunnels, this creates a burden for the concentrator.

One solution to the problem is simply to block all broadcast/multicast packets from going over tunnels (where the address resolution protocol (ARP) is handled with a proxy-ARP, etc.). However, there are some critical control packets that are multicast, such as Wireless Network Management Protocol (WNMP) control packets. Blocking these WNMP packets severely limits the ability to facilitate roaming and load balancing wireless clients across access points (APs) that are at a single physical location but not sharing any infrastructure between them. For example, a service provider telephone company (telco) could deploy two APs in two adjacent stores in a shopping mall each having its own network link. The two APs will Layer 3 (L3) adopt to the telco NoC concentrator, each having L2-tunnels to the NoC to tunnel all user traffic, but the APs do not know anything about each other (they are not neighbors), thereby requiring separate links. This use case is important because most of the wireless hotspot/guest-access deployments are going to look the same and have the same type of deployment when they are commissioned and operated by a telco. Another problem with this approach is it does not offer any control over how unicast traffic is controlled among the sites, in that all clients in all sites can potentially talk to each other, creating traffic and overhead problems.

Another solution to the problem is to turn off inter-tunnel bridging at the NoC L2-tunnel concentrator, i.e., packets coming from one L2 tunnel will not be sent to other L2 tunnels. However, this solution has the same problems described above for the first solution. In addition, a WNMP roam notification coming in from one AP will not be sent to any other AP, including an AP that is nearby, which will delay handoffs of mobile devices. Another problem with this solution is that it blocks any unicast communication from happening between two clients on two different APs (across two different L2 tunnels).

Hence, there is a need of a system and method to provide improved control over how data is bridged in these kinds of very large L2 tunneled deployments in a network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
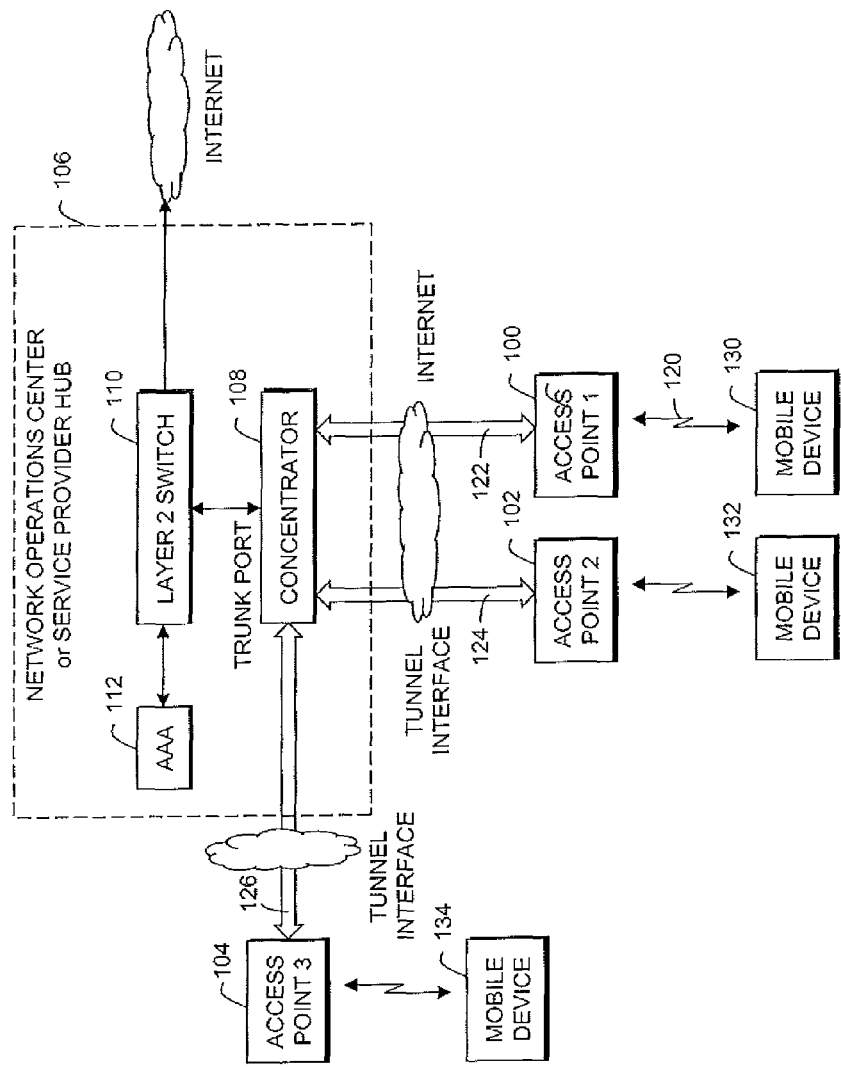
FIG. 1 is a simplified block diagram of a bridging system, in accordance with a first embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a system and method to provide improved control for bridging data in very large L2 tunneled deployments of a network. In particular, the present invention associates access points with a location parameter that identifies access points that are physical neighbors or that share routing attributes. The present invention can then group these access points together such that packets that are received from one access point in the group are bridged to the other access points in the group. In effect, the present invention slices up large L2 domains into smaller parts, so that packets that remain within a group are immediately bridged, whereas packets being sent between groups are replicated normally for their separate tunnels.

Referring to FIG. 1, an access point (AP 100) will send out periodic IEEE 802.11 beacons to let mobile devices know that wireless local area network (WLAN) services are available. The beacon will contain a service set identifier (SSID) and/or router identification identifying the WLAN/AP/SSID. Upon detecting the beacon, a mobile device 130 will attempt to associate with that AP 100 based on policies of its mobile phone service provider telephone company (telco) service.

Once associated, the mobile device 130 will send an authentication message to the telco via the AP 100. The authentication message can access a home Authentication, Authorization, and Accounting (AAA) server 112 of the mobile device via the service provider in order for the network to authenticate the mobile device. Upon authentication, the AP 100 configures a Layer-2 Tunneling Protocol of Version 1, 2, or 3 (L2tpv1/2/3) tunnel 122 between the AP 100 and a concentrator 108 of the telco Network Operations Center (NoC) or a service provider hub.

In operation, an access point or other network entity responds to a wireless mobile that is seeking a remote, service provider network to extend an end-to-end wireless connection from the wireless mobile to that service provider network. As described herein, the mobile device includes any device configured with a wireless local area or wide area network interface operable to transmit and receive data over the network including, but not limited to, a wide variety of consumer electronic platforms such as mobile stations, mobile units, mobile nodes, user equipment, user devices, mobile devices, remote unit platforms, subscriber equipment, subscriber stations, access terminals, remote terminals, terminal equipment, gaming devices, music devices, laptop computers, desktop computers, tablets, netbooks, printers, scanners, smart phones, cellular phones, personal digital assistants, and the like, all referred to herein as mobile devices.

In an exemplary embodiment, such as shown in FIG. 1, the present invention utilizes Internet, IEEE 802.11, and associated protocols, but the present invention can be utilized with other protocols. Wireless Local Area Networks (WLANs) are generally defined in IEEE 802.11 standards and can operate over the unregulated 2.4 and 5 GHz frequency bands spectrum. However, it should be recognized that the present invention is also applicable to a communication system operable in a network that may be based on different wired or wireless technologies. For example, the description that follows can apply to an access network that is IEEE 802.xx-based, employing wireless technologies such as RF, IrDA (infrared), Bluetooth, ZigBee (and other variants of the IEEE 802.15 protocol), IEEE 802.11 (any variation), IEEE 802.16 (WiMAX or any other variation), IEEE 802.20, Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention. In an exemplary embodiment, the mobile device and access point are preferably compliant with at least the IEEE 802.11 specification.

Those skilled in the art will recognize that FIG. 1 does not depict all of the equipment necessary for system to operate but only those system components and logical entities particularly relevant to the description of embodiments herein. For example, an access point, access port, eNodeB, or base station can be connected with or comprise one or more devices such as WLAN stations (which include access nodes, Media Access Controllers, AP controllers (and/or switches), base transceiver stations, base site controllers, packet control functions, packet control units, and/or radio network controllers. However, all of these other devices are not shown specifically. The devices of the system can communicate with either other with a wireless or wired (e.g. Ethernet) connections. Such communication can be a direct communication or a communication relayed through a higher level network entity such as a switch, controller, resource manager, and the like.

Each of the devices shown in FIG. 1 are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic. Therefore, each WLAN network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the tunnel configuration aspect of the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option.

It is envisioned that the present invention utilizes existing wireless security protocols and other security mechanisms between the mobile device and the remote, service provider network. For example, the wireless mobile can utilize IEEE 802.11i (Wi-Fi Protected Access—WPA and WPA2), AES encryption, extensible authentication protocol (EAP), and IEEE 802.1x, Wired Equivalent Privacy (WEP), etc. authentication to communicate with its home network or service provider network. Specifically, the tunnel connection enables whatever wireless security is utilized by the mobile to be extended to the service provider. This can include encapsulating the wireless security over another protocol, e.g. wired protocols such as IPsec, and the like to the service provider. The AP can create other secure tunnels such as with point-to-point tunneling protocol (PPTP), Internet Protocol Security (IPsec), Secure Sockets Layer (SSL)/Transport Layer Security (TLS), and the like.

Referring back to FIG. 1, a system architecture is illustrated with an access point (AP) 100 or other network infrastructure entity of a wireless local area network (WLAN) that provides a mobile device 104 access to a service provider network 106 according to exemplary embodiments of the present invention. The WLAN can include other entities (not shown) as are known in the art to provide connectivity to multiple wireless mobiles using at least one access point. The AP 100 is an exemplary wireless network infrastructure product as described herein.

The AP 100 or network entity is operable to establish an end-to-end tunnel connection 122 for the mobile device 130 from the AP to the concentrator 108 of the service provider network NoC 106 or service provider hub. The concentrator 108 is provided specifically to handle a large number of incoming tunnels for the network. For each tunnel 122, 124, 126, a mobile device 130, 132, 134 is considered a virtual member of the connected network and generally can access the network as if locally connected, i.e. applications can run without any awareness that the mobile device is outside the network. In particular, each tunnel services a virtual local area network (VLAN) for a network switch 110 on a trunk port carrying the connections from the tunnels. In particular, a Layer 2 VLAN extends over a routed Layer 3 network, where the VLAN extends beyond both ends of the tunnel that is between the access point and the NoC concentrator 108.

In accordance with the present invention, access points can be grouped together such that tunneled traffic packets that are received from an access point in the group of the network are bridged to the other access points in the same group. Bridging can be a wired-to-tunnel connection or a tunnel-to-tunnel connection, wherein unicast packets need not be replicated. In some embodiments, the present invention slices a large L2-domain using a specialized router-id parameter in the L2tpv1/2/3 configuration, where it is assumed that the L2tpv1/2/3 configuration is used to extend the L2-tunnel for a corporate/guest VLAN between the NoC and APs in a spoke-and-hub configuration.

Figure 2:
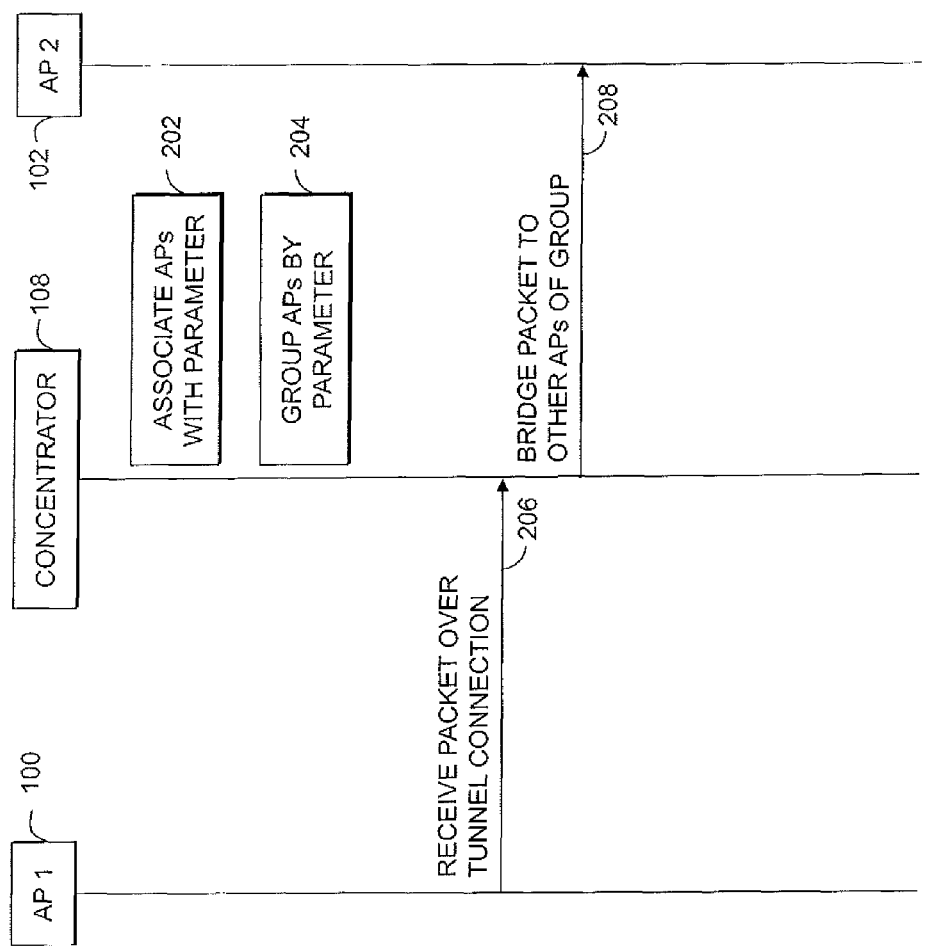
FIG. 2 is a flow diagram of the operation of the system of FIG. 1, in accordance with a second embodiment of the present invention.

In a first embodiment, and referring to FIGS. 1 and 2, AP1 100 and AP2 102, which are nearby physically, are each associated 202 with a location parameter such as an L2tp router identification (router-id). In particular, the access points are configured to have a router-id that follows a particular pattern depending on their location. For example, AP1 can be configured with a router-id of "192.168.1.1" and AP2 can be configured with a router-id of "192.168.1.2". There is also an AP3 104 in the network which is deployed in a different physical location and has a different router-id, such as "192.168.2.1". All three APs of the network have respective L2tpv1/2/3 tunnels 122, 124, 126 terminated on the network concentrator 108 of a NoC. The concentrator will group 204 access points in accordance with a common pattern in the location parameter (i.e. router-id). The concentrator learns about these as router-ids as APs form L2tp tunnels with it, and the concentrator will maintain information about the established L2tp tunnels, VLAN information, associated AP Media Access Control (MAC) addresses, and the control connection ID for all the APs.

In particular, the concentrator can group tunnels from APs with a common pattern, such as having the same first three bytes (i.e. thirty bits) in their router-id, for example. In this case, AP1 and AP2 are grouped together because they fall under the range of "192.168.1.*/30." The concentrator or switch can maintain a table for the groupings. In this scenario, AP3 will be maintained in a separate group with its tunnel 126 since it does not have the same router-id common patterns as AP 1 and AP2. In another example, the grouping can be based on any pattern that can be matched with any sort of wild card mask, such as in IPv4 subnets. For example, "10.1.*.*" and "10.2.*.*" can match if only the first two bytes define the grouping. Upon receiving a packet 206 over an L2tp tunnel from an AP in the group (e.g. AP1 100), the concentrator 108 will bridge 208 the packet between the respective Layer-2 tunnels 122, 124 of all other access points that are part of the grouping, i.e. AP2 but not AP3.

In addition, based on the table of grouped APs and L2-tunnels, the concentrator 108 or other controller will take decisions related to broadcast/multicast/unicast traffic (including WNMP roam notifications), and will share pairwise master key (PMK) cache info and WNMP roam notifications between AP1 and AP2 on tunnels 122, 124 but not AP3 on the L2-tunnel 126. In other words, the WNMP roam notifications (which are multicast in nature) received from AP1 will be sent to AP2 because the router-ids of the tunnels have a common pattern, but not sent to AP3 which has a different router-id pattern. This kind of grouping will reduce the load of duplicating broadcast/multicast packets across different tunnels significantly as the number of groups will be smaller than the number of tunnels. It also facilitates grouped-unicast conversations creating islands of smaller L2-domains out of one a very large L2-domain.

In a second embodiment, still referring to FIGS. 1 and 2, AP1 100 and AP2 102, which again are nearby physically, are associated 202 with a location parameter such as an entry in a listing in a novel sanctioned AP table in a controller such as the concentrator 108, in accordance with the present invention. The sanctioned table enhances an existing unsanctioned AP detection feature to list sanctioned neighbors for all the APs. As defined herein "sanctioned" APs are APs that are authorized by the concentrator or other controller. "Unsanctioned" APs are unauthorized APs. In other words, each AP adopted to a WLAN controller is a sanctioned AP/BSSID part of the WLAN infrastructure.

The concentrator 108 can group tunnels from APs that are sanctioned as neighbors. In particular, AP1 and AP2 can hear each other while doing off-channel scanning, establishing that they are neighbors, and this information is shared with the concentrator, which maintains information about the list of established L2pt tunnels including VLAN information, MAC addresses, and control connection IDs all of the APs in the sanctioned table. In this case, AP1 and AP2 are grouped together when AP1 and AP2 are sanctioned as neighbors. In this scenario, AP3 will be maintained in a separate group since it is not a sanctioned neighbor of AP1 or AP2, i.e. AP1 and AP2 cannot detect AP3 during off-channel scanning.

Upon receiving 206 a packet over an L2tp tunnel from an AP in the group (e.g. AP1 100) by the concentrator 108, the concentrator 108 will bridge 208 the packet to the tunnels 124 from any of the access points in its sanctioned list that can be grouped in accordance with their location parameter, i.e. bridge to AP2 but not AP3.

As before, based on the sanctioned neighbor table of grouped L2-tunnels, the concentrator 108 or other controller will take decisions related to broadcast/multicast/unicast traffic (including WNMP roam notifications), and will share PMK cache info and WNMP roam notification between AP1 and AP2 but not AP3 on the bridged L2-tunnels 122, 124.

Figure 3:
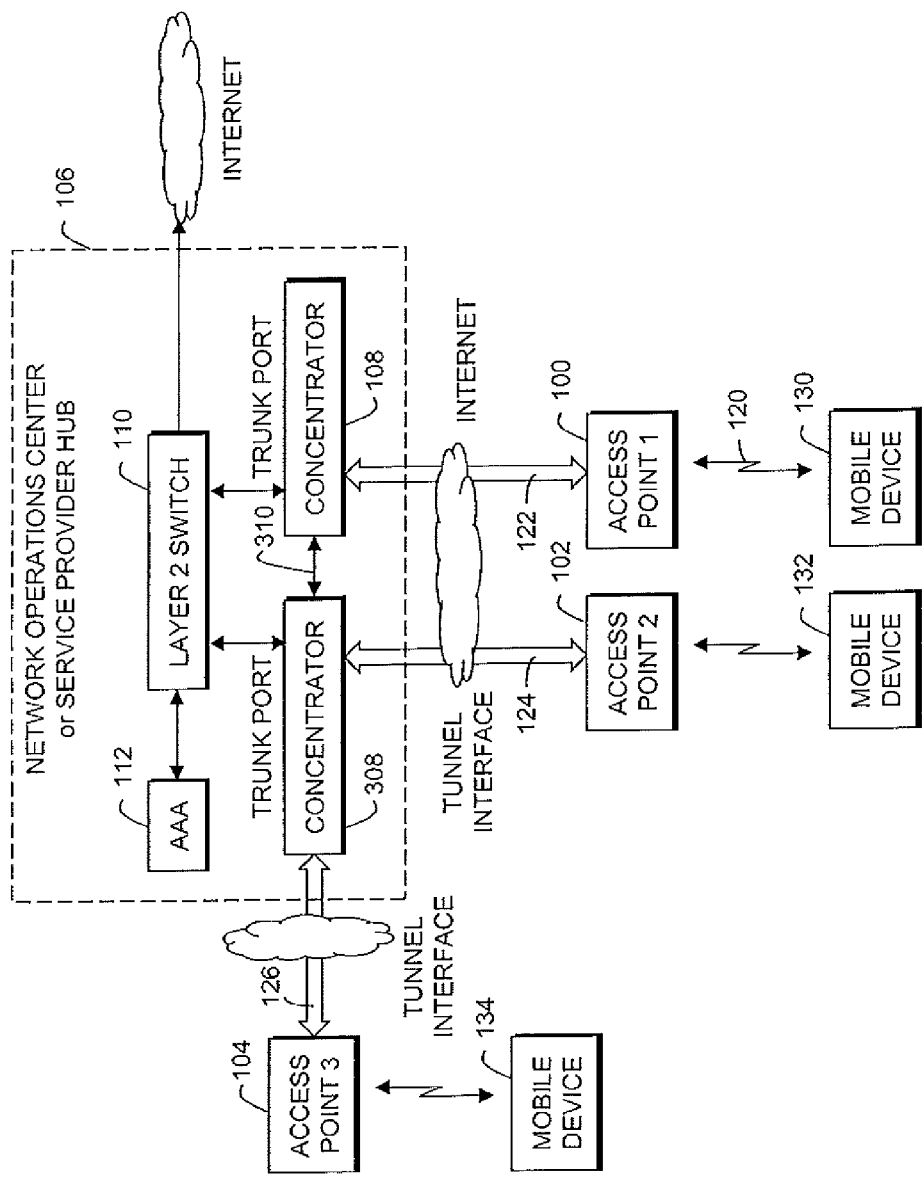
FIG. 3 is a simplified block diagram of a bridging system, in accordance with other embodiments of the present invention.
Figure 4:
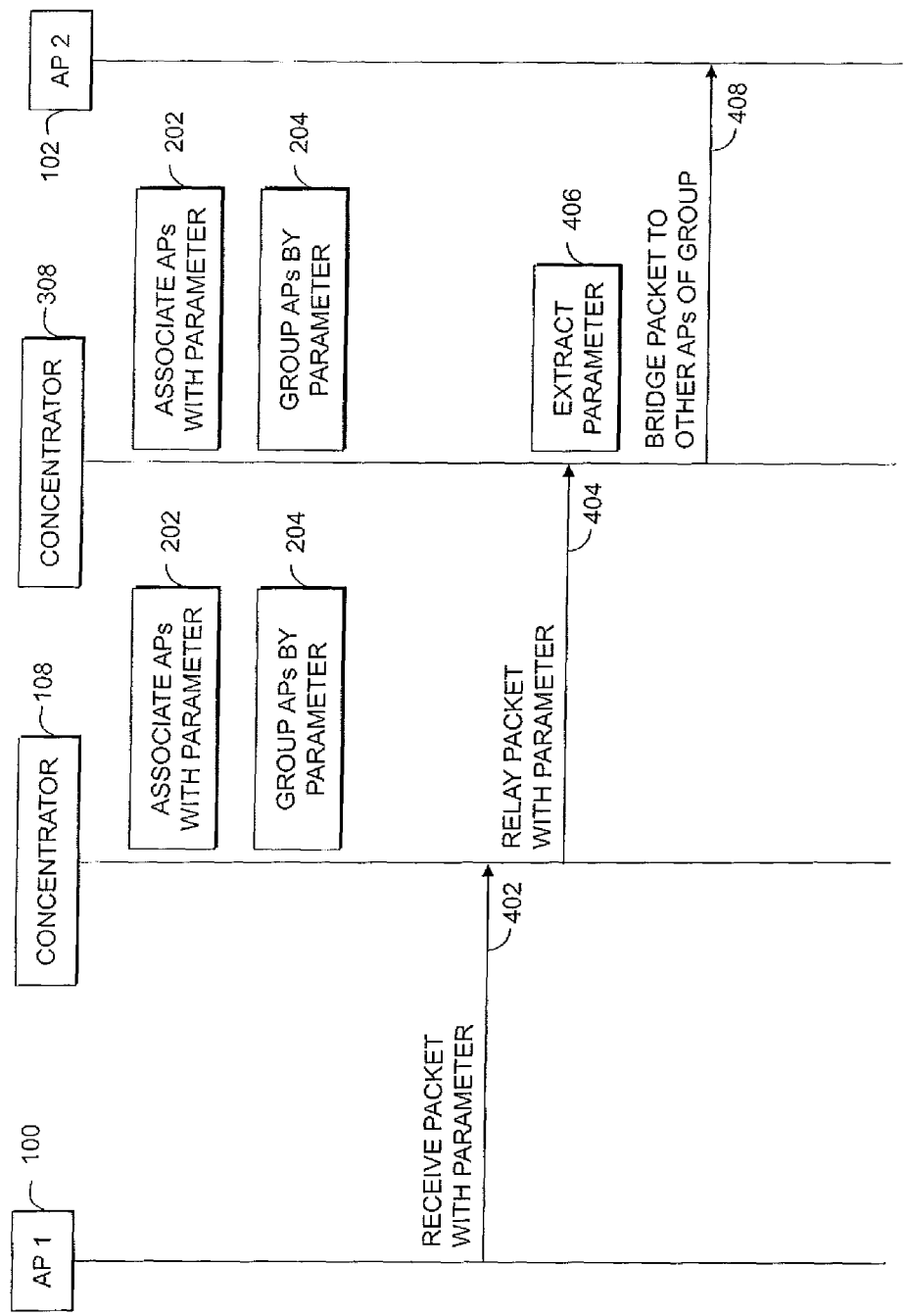
FIG. 4 is a flow diagram of the operation of the system of FIG. 3, in accordance with other embodiments of the present invention.

Referring to FIGS. 3 and 4, although both of the above embodiments provide a solution to handling very large L2-domains, an issue arises when two neighboring APs (e.g. AP1 100 and AP2 102) have L2 tunnels 122, 124 connecting to two different respective concentrators 108, 308 at the NoC 106. In particular, the present invention provides a technique for WNMP roam notification packets to traverse between AP1 and AP2, to facilitate seamless roaming, for example. In particular, the present invention can utilize an unused field in the WNMP roam notification packets, or add a new field, that carries the location parameter information, such as the router-id described above in the first embodiment or the sanctioned neighbor table listing entry in the second embodiment.

In this dual-concentrator variation of the first embodiment, AP1 100 and AP2 102, which again are nearby physically, are associated 202 with a location parameter such as an L2tp router identification (router-id) in one or both concentrators 108, 308 or other controller, in accordance with the present invention. As before, the access points are configured to have a router-id that follows a particular pattern depending on their location, and a common pattern in the location parameter (i.e. router-id) can be matched (e.g. the first three bytes match) to define AP groupings. The concentrators maintain information about the established L2tp tunnels, VLAN information, MAC addresses, and the control connection ID for all the APs.

Each concentrator 108, 308 can group the APs with matching router-id patterns. In this case, AP 1 and AP2 can be grouped together. In this scenario, AP3 will be maintained in a separate group since does not have the matching pattern of AP1 or AP2.

When a mobile device 130 roams from AP2 to AP1, AP1 will send a WNMP roam notification to its associated concentrator 108 or controller. Upon receiving 402 the WNMP roam notification packet 206 over an L2tp tunnel 122 from an AP in the group (e.g. AP1 100) by the associated concentrator 108, that concentrator 108 will relay 404 the packet with the location information (i.e. router-id) of AP1 embedded therein to the other concentrator 308 over the wired connection 310 such that the other concentrator can extract 406 the location information from the packet and bridge 408 the packet to any of its access points, i.e. AP2 but not AP3, that can be grouped together in accordance with the location parameter, such as having a router-id of the embedded location parameter matching patterns of router-ids of APs (i.e. AP2) associated with that concentrators 308. The concentrators do not share the same grouping table since ordinary packets that arrive on the wired interface 310 between concentrators do not carry this information. However, WNMP roam notification packets can be modified to carry a location parameter, as described herein, and these identified packets can be grouped and bridged with any matching group in the concentrator 308.

As before, based on the table of grouped L2-tunnels, the concentrators 108, 308 or other controller will take decisions related to broadcast/multicast/unicast traffic (including WNMP roam notifications), and will share PMK cache info and WNMP roam notification between AP1 and AP2 but not AP3 on the L2-tunnels 122, 124.

Similarly, in the dual-concentrator variation of the second embodiment, AP1 100 and AP2 102, which again are nearby physically, are associated 202 with a location parameter in each concentrator such as an entry in a listing in a novel sanctioned AP table in each concentrator 108, 308 or other controller, in accordance with the present invention. The sanctioned tables enhance an existing unsanctioned AP detection feature to list sanctioned neighbors for all the APs for each concentrator.

Each concentrator 108, 308 can group APs that are sanctioned as neighbors. In particular, AP1 and AP2 can hear each other while doing off-channel scanning, and this information is shared with its concentrator or controller, which maintains information about the groupings of established L2tp tunnels, VLAN information, MAC addresses, and control connection IDs for each AP. In this case, the two AP1 and AP2 are grouped together when AP1 and AP2 are sanctioned as neighbors. In this scenario, AP3 will be maintained in a separate group since it is not a sanctioned neighbor of AP1 or AP2.

When a mobile device 130 roams from AP2 to AP1, AP1 will send a WNMP roam notification to its associated concentrator 108 or controller. Upon receiving 402 the WNMP roam notification packet 206 over an L2tp tunnel 122 from an AP in the group (e.g. AP1 100) by the associated concentrator 108, that concentrator 108 will relay 404 the packet with the location information of AP1 embedded therein to the other concentrator 308 over the wired connection 310 such that the other concentrator can extract 406 the location information from the packet and bridge 408 the packet to the tunnels 124 from any of its access points that can be grouped together in accordance with the location parameter, i.e. AP2 but not AP3.

Specifically, in bridging 408 the concentrator 308 or other controller can check the source of the roam notification by looking up AP1 in its sanctioned table, identify sanctioned neighboring APs with L2 tunnels that have the same location parameter, and perform a reverse look up of API's MAC address and L2tp tunnel/session, and bridge 406 the packets to the tunnels 124 of all access points (e.g. AP2 102) that are listed as sanctioned neighbors in its table.

As before, based on the tables of grouped L2-tunnels, the concentrators 108, 308 or other controller will take decisions related to broadcast/multicast/unicast traffic (including WNMP roam notifications), and will share PMK cache info and WNMP roam notification between AP1 and AP2 but not AP3 on the L2-tunnels 122, 124.

Advantageously, the present invention provides novel techniques to solve the scalability problem in large L2 deployments, such as with hub-and-spoke L2-tunneled deployments, by grouping commonly location AP together in groups, wherein packets are bridged between all tunnels of APs in the group.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for access point groupings bridging tunneled traffic for a communication network, comprising:
    associating each access point with a location parameter;
    grouping access points in accordance with the location parameter, wherein the access points of the grouping have Layer-2 tunnels established to two different concentrators of a Network Operations Center;
    receiving a packet; and
    bridging the packet between Layer-2 tunnels of all access points that are part of the grouping,
    wherein the location parameter of one access point is embedded in a multicast Wireless Network Management Protocol roam notification packet received from the one access point by an associated concentrator, and the location parameter is relayed to the other concentrator that is operable to extract the location parameter from the packet and bridge the packet to any of its access points that can be grouped in accordance with the location parameter.

2. The method of claim 1, wherein the location parameter is a router identification.

3. The method of claim 2, wherein the grouping includes grouping access points having router identification bytes matching a predetermined common pattern.

4. The method of claim 1, wherein each access point has a Layer-2 tunnel established to one concentrator.

5. A method for access point groupings bridging tunneled traffic for a communication network, comprising:
    associating each access point with a location parameter that is an entry in a neighboring access point list that is part of a table identifying Layer-2 tunnels and Media Access Control addresses for each access point;
    grouping access points in accordance with the location parameter;
    receiving a packet that is a multicast Wireless Network Management Protocol roam notification received from one access point of the grouping; and
    bridging the packet between Layer-2 tunnels of all access points that are part of the grouping by,
        checking the source of the roam notification by looking up the one access point in the table,
        identifying neighboring access points in the table,
        performing a reverse look up for the address and tunnel for the one access point, and
        bridging the packets between the tunnels of all access points that are listed neighbors in the table.

6. The method of claim 5, wherein the neighboring access point list is sanctioned.

7. An apparatus for providing access point groupings bridging tunneled traffic for a communication network, comprising:
    at least two concentrators of a Network Operation Center, the at least two concentrators operable to: associate access points of the network with a location parameter on separate Layer-2 tunnels, group the access points in accordance with the location parameter, wherein one concentrator is operable to receive a Wireless Network Management Protocol roam notification packet with the location parameter of one access point embedded therein, and relay the packet to the other concentrator that is operable to extract the location parameter from the packet and bridge the packet to any of its access points that can be grouped in accordance with the location parameter.

8. The apparatus of claim 7, wherein the location parameter is a router identification.

9. The apparatus of claim 8, wherein the grouping includes grouping access points having router identification bytes matching a predetermined common pattern.

10. The apparatus of claim 7, wherein each access point has a Layer-2 tunnel established to one concentrator.

* * * * *

UNITED STATES PATENT AND TRADEMARK OFFICE
CERTIFICATE OF CORRECTION

| | | |
|---|---|---|
| PATENT NO. | : 8,842,651 B2 | Page 1 of 1 |
| APPLICATION NO. | : 13/687116 | |
| DATED | : September 23, 2014 | |
| INVENTOR(S) | : Poola et al. | |

It is certified that error appears in the above-identified patent and that said Letters Patent is hereby corrected as shown below:

On the title page item 72 Inventors: "Sundaresan Sundaram, Karnataka (IN)" should be -- Sundaresan Sundaram, Bangalore (IN) --

Signed and Sealed this
Tenth Day of May, 2016

Michelle K. Lee
*Director of the United States Patent and Trademark Office*